Aug. 2, 1927.
F. F. GENTSCH
1,637,744
DIRECTION SIGNAL FOR MOTOR VEHICLES
Filed Sept. 4, 1926
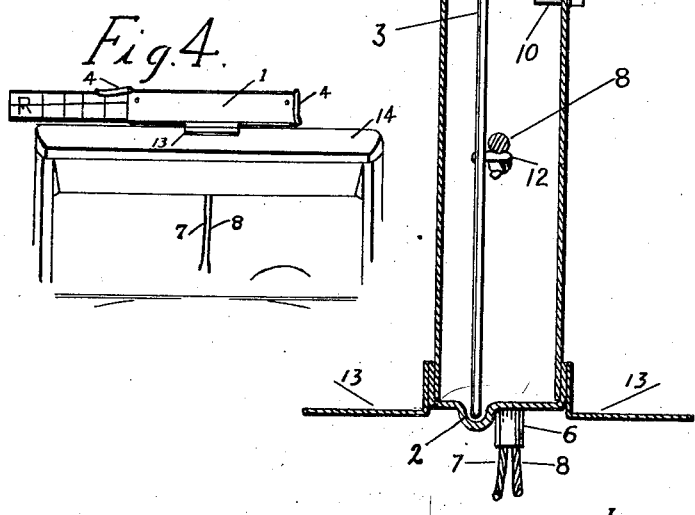
Inventor,
Frank F. Gentsch
By Arthur H. Ewald,
Attorney.

Patented Aug. 2, 1927.

1,637,744

UNITED STATES PATENT OFFICE.

FRANK F. GENTSCH, OF CINCINNATI, OHIO.

DIRECTION SIGNAL FOR MOTOR VEHICLES.

Application filed September 4, 1926. Serial No. 133,691.

My invention relates to direction signals for motor vehicles and has particular reference to the provision of a simple, inexpensive and efficient signal device whereby the driver of a motor vehicle may apprise other drivers and pedestrians as to his intention of making a turn and the direction thereof.

The principal object of this invention is to provide a simple and inexpensive device of the character described which may be so secured to a motor vehicle that a single device may be visible both from the front and the rear of the vehicle.

Further objects of the invention will appear from the following detailed description thereof.

In the drawings:

Figure 1 is a front elevation of a direction signal constructed in accordance with this invention.

Figure 2 is a front elevation showing the signal extended, the operating mechanism being shown by broken lines.

Figure 3 is a transverse sectional view.

Figure 4 is an elevation showing the device attached to a motor vehicle.

The numeral 1 indicates a casing, the same being preferably constructed of metal. The upper and lower walls of the casing are provided with grooves 2 which constitute slideways for the signal plate 3. Hingedly secured at each end of the casing 1 is a closure 4. The closures 4 are weighted by means of lead or other metal, as shown at 5, so as to maintain them normally in closed position. The bottom wall of the casing 1 is provided with a tubular opening 6 for operating cords 7 and 8 respectively. Mounted on brackets 9 in the casing 1 are rollers 10 over which the respective cords 7 and 8 ride, as illustrated in Figure 2 of the drawings. One end of the cord 7 is secured to one end of the signal plate 3, as illustrated at 11, and one end of cord 8 is secured to the opposite end of the signal plate, as indicated at 12. The opposite ends of the respective cords extend through the tubular opening 6 into the interior of the car to a place convenient to the driver, as shown in Figure 4. The lower portion of the casing is provided with flanges 13 by means of which the device may be secured to the top 14 of a motor vehicle.

The operation of the device is as follows: When attached to the motor vehicle, the free ends of cords 7 and 8 respectively extend into the body of the vehicle to a point convenient to the driver, as above mentioned. When the driver desires to make a turn, he pulls on one of the cords, said cords having appropriate indicia (not shown) to indicate the direction which it is intended to indicate. Pulling on cord 7, for instance, will cause the signal plate 3 to be drawn outwardly from the casing 1 to the position shown in Figures 2 and 3, the closure 4 being lifted by the movement of the plate. Said closure furthermore, by reason of its weight, provides a convenient check to prevent the signal plate from operating too freely and thus possibly becoming dislodged during the operation of the vehicle. When the denoted movement has been accomplished and the signal has therefore served its purpose, the signal plate is returned into the casing by pulling upon the opposite cord until the plate is again fully concealed in the casing. Similarly, pulling upon the cord 8 will extend the signal plate in the opposite direction to indicate a turn in said direction, as indicated by broken lines in Figure 2 of the drawings.

As will be understood, the signal plate 3 may be provided with suitable indicia for the purpose of indicating the proposed direction of turn, as shown in Figure 2, such indicia, however, not being essential for the reason that the mere extension of the signal plate will in itself serve as a sufficient warning of intention. As shown in Figure 4, the device is of such dimension and the signal plate of such length that when extended in either direction it is adapted to extend slightly beyond the line of the car itself so as to be visible either from the front or the rear, and by reason of such extension have the desired prominence immediately to attract the attention to its operation.

It will be understood that numerous modifications in details of construction may be made without departing from the scope of my invention as defined in the appended claim, and that all such modifications are deemed as a part of the present invention.

Having thus fully described my invention, what I claim as new and desire to secure by Letters Patent is:

A device of the character specified, comprising a casing open at both ends, a unitary signal plate slidably mounted in said casing, two cords, one end of one of said cords being attached to one end of said signal plate, and one end of the other cord being attached to the opposite end of said signal plate, roller bearings in said casing at the opposite ends thereof, each of said cords being adapted to pass over the roller bearings in the end of the casing opposite the end of its attachment to said plate, the free ends of said cords being extended through an opening in the lower central portion of said casing, whereby said signal plate may be extended through either end of the casing by the operation of one or the other of said cords, indicia on the respective end surfaces of said plate adapted to be displayed beyond the respective ends of the casing when said plate is extended, a closure for each end of said casing, said closures being pivotally mounted at the upper ends of said casing, and each being adapted to be operated by the extension of said plate through its end of the casing, the lower end of each of said closures being weighted so as gravitationally to return them to closing position, and means for attaching said casing to a motor vehicle.

FRANK F. GENTSCH.